(12) United States Patent
Baron et al.

(10) Patent No.: US 11,316,806 B1
(45) Date of Patent: Apr. 26, 2022

(54) BULK MESSAGE DELETION

(71) Applicant: Snap Inc., Santa Monica, CA (US)

(72) Inventors: Bradley Baron, Seattle, WA (US); John Krzemien, Seattle, WA (US); Amit Saurav, Sammamish, WA (US)

(73) Assignee: Snap Inc., Santa Monica, CA (US)

( * ) Notice: Subject to any disclaimer, the term of this patent is extended or adjusted under 35 U.S.C. 154(b) by 17 days.

(21) Appl. No.: 16/774,869

(22) Filed: Jan. 28, 2020

(51) Int. Cl.
| | |
|---|---|
| *G06F 15/16* | (2006.01) |
| *H04L 51/02* | (2022.01) |
| *H04L 51/043* | (2022.01) |
| *H04L 51/00* | (2022.01) |

(52) U.S. Cl.
CPC ........... *H04L 51/02* (2013.01); *H04L 51/043* (2013.01); *H04L 51/16* (2013.01)

(58) Field of Classification Search
CPC ........ H04L 51/02; H04L 51/043; H04L 51/16
USPC ........................................................ 709/206
See application file for complete search history.

(56) References Cited

U.S. PATENT DOCUMENTS

| | | | |
|---|---|---|---|
| 5,754,939 A | 5/1998 | Herz et al. | |
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

Castelluccia, Claude, et al., "EphPub: Toward robust Ephemeral Publishing", 19th IEEE International Conference on Network Protocols (ICNP), (Oct. 17, 2011), 18 pgs.

(Continued)

*Primary Examiner* — Thu Ha T Nguyen
(74) *Attorney, Agent, or Firm* — Schwegman Lundberg & Woessner, P.A.

(57) ABSTRACT

Systems and methods are provided for deleting messages. The systems and methods include operations for: establishing, by a computing device, a communication session between a plurality of users; receiving a plurality of messages in the communication session; determining that a first message of the plurality of messages has been read by a first user of the plurality of users at a read time; in response to determining that the first message has been read by the first user at the read time, automatically associating the read time with a second of the plurality of messages that precedes the first message in the communication session; and automatically deleting the first and second messages in response to determining that an elapsed time measured from the read time associated with the first and second messages corresponds to a threshold time period.

20 Claims, 9 Drawing Sheets

(56) References Cited

U.S. PATENT DOCUMENTS

| | | |
|---|---|---|
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,185,063 B1 * | 11/2015 | Kumar ................. H04L 51/043 |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 * | 8/2017 | Spiegel ................. H04L 51/16 |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,573,312 B1 * | 2/2020 | Thomson ................ G10L 15/26 |
| 10,880,322 B1 * | 12/2020 | Jakobsson ............. G06F 21/566 |
| 11,134,046 B2 * | 9/2021 | Spiegel ................... H04L 51/16 |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0248788 A1 * | 10/2008 | Smith ................... H04M 3/493 455/414.3 |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2009/0144377 A1 * | 6/2009 | Kim ....................... G06Q 10/10 709/206 |
| 2009/0157845 A1 * | 6/2009 | Kim ....................... G06Q 10/10 709/218 |
| 2009/0158176 A1 * | 6/2009 | Kalaboukis ............. H04L 51/32 715/758 |
| 2010/0042690 A1 * | 2/2010 | Wall ...................... H04L 51/046 709/206 |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0069131 A1 * | 3/2012 | Abelow ................ G06Q 10/067 348/14.01 |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0290950 A1 * | 11/2012 | Rapaport ........... H04N 21/8358 715/753 |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0006129 A1 * | 1/2014 | Heath ................. G06Q 30/0222 705/14.23 |
| 2014/0032682 A1 | 1/2014 | Prado et al. |
| 2014/0096033 A1 * | 4/2014 | Blair ...................... H04L 51/04 715/752 |
| 2014/0122787 A1 | 5/2014 | Shalvi et al. |
| 2014/0201527 A1 | 7/2014 | Krivorot |
| 2014/0258032 A1 * | 9/2014 | Psota .................. G06Q 30/0609 705/26.35 |
| 2014/0282096 A1 | 9/2014 | Rubinstein et al. |
| 2014/0297348 A1 * | 10/2014 | Ellis ............... G06Q 10/063114 705/7.15 |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0073929 A1 * | 3/2015 | Psota .................. G06Q 30/0605 705/26.2 |
| 2015/0188870 A1 * | 7/2015 | Sharp .................... H04L 51/22 715/752 |

(56) References Cited

U.S. PATENT DOCUMENTS

| | | | |
|---|---|---|---|
| 2015/0199082 A1 | 7/2015 | Scholler et al. | |
| 2015/0227602 A1 | 8/2015 | Ramu et al. | |
| 2015/0381533 A1* | 12/2015 | Klemm | H04L 51/02 |
| | | | 709/206 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0127534 A1* | 5/2016 | Celik | H04M 1/72436 |
| | | | 455/566 |
| 2016/0180887 A1 | 6/2016 | Sehn | |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0118165 A1* | 4/2017 | Kumar | G06F 16/9537 |
| 2017/0161382 A1 | 6/2017 | Ouimet et al. | |
| 2017/0263029 A1 | 9/2017 | Yan et al. | |
| 2017/0287006 A1 | 10/2017 | Azmoodeh et al. | |
| 2017/0295250 A1* | 10/2017 | Samaranayake | H04L 51/043 |
| 2017/0331952 A1* | 11/2017 | Rogers | H04L 65/1069 |
| 2017/0374003 A1 | 12/2017 | Allen et al. | |
| 2017/0374508 A1 | 12/2017 | Davis et al. | |
| 2019/0197364 A1* | 6/2019 | Cheng | G06F 16/51 |
| 2019/0199745 A1* | 6/2019 | Jakobsson | H04L 63/1433 |
| 2019/0222540 A1* | 7/2019 | Relangi | G06Q 30/01 |
| 2019/0244152 A1* | 8/2019 | Yan | G06N 20/00 |
| 2019/0369827 A1* | 12/2019 | Winer | G06F 3/0487 |
| 2020/0225673 A1* | 7/2020 | Ebrahimi Afrouzi | |
| | | | G05D 1/0214 |
| 2020/0243094 A1* | 7/2020 | Thomson | G10L 15/22 |
| 2021/0089040 A1* | 3/2021 | Ebrahimi Afrouzi | |
| | | | A47L 9/2894 |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.

* cited by examiner

BULK MESSAGE DELETION

TECHNICAL FIELD

The present disclosure generally relates to the technical field of social networks. In particular, the present embodiments are generally directed to managing message retention and deletion.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
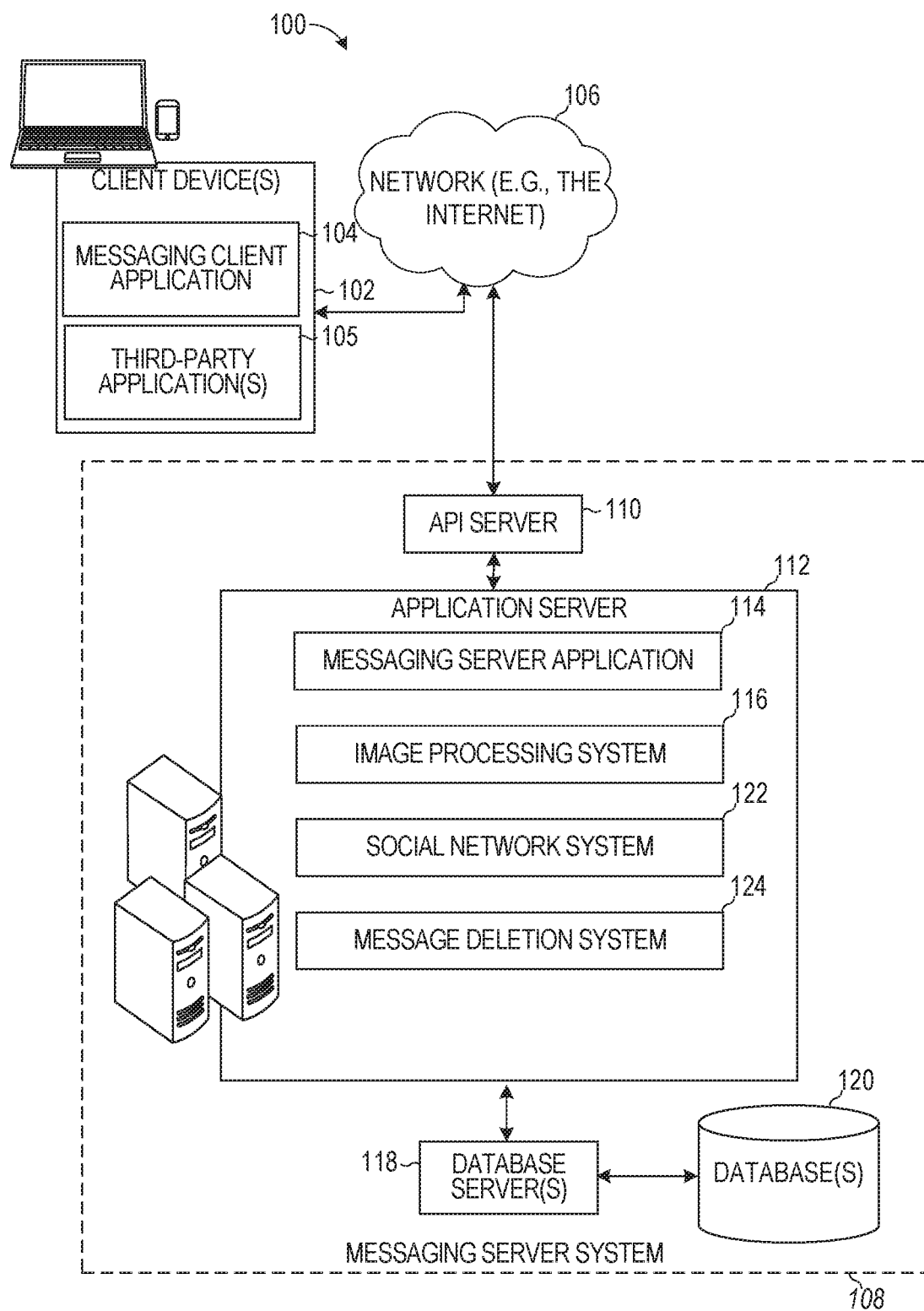
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure, in the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users and consumes a great deal of storage resources as videos and images grow in resolution and size. As such, managing the storage resources used to maintain the chat sessions has become of great interest. One way in which the storage resources are managed is by automatic deletion of the messages on a periodic basis. While such automatic deletion generally works well, the automatic deletion is performed on a message basis and consumes a great deal of overhead. Namely, the automatic deletion iterates through every message exchanged in the conversation to determine whether that message meets some deletion criteria. Such iterations through the messages, when done for all the chat sessions managed by the system, can be extremely tedious and time consuming and requires dedicated processing resources.

The disclosed embodiments improve the efficiency of using the electronic device by providing a system that automatically deletes messages based on message sent times and/or message read times on a bulk message basis. Specifically, the disclosed system automatically deletes a plurality of messages exchanged in a communication session based on a read time of a given one of the plurality of messages. Namely, the disclosed system determines that a given one of the plurality of messages has been read by a given user of the conversation session. In response, the disclosed system automatically associates prior messages received in the conversation session (those messages received before the given one of the plurality of messages) with the same read time. The disclosed system then employs a deletion policy which deletes messages within a threshold period of time from when the messages are read. As an example, the disclosed system deletes messages 24 hours after they are read. In this way, after the given message is read by the given user, the given message is deleted after the threshold period of time from when the given message was read along with the prior messages. In some cases, when messages are not read within a second threshold period of time, such as after 31 days, the messages are automatically deleted. Deleting a message removes access to the message for any participant or user of the conversation session including the user or participant who initially sent the message. This way, when a recipient user reads a message, the message (and all prior messages received in the conversation session) is deleted for the recipient and the sender of the message in the conversation session after the threshold period of time from when the message is read.

Rather than individually determining the read times for the prior messages, the disclosed system assumes that all the prior messages have been read at the same read time as the latest message that is read and associates such prior messages with the same read time. This increases the efficiencies of the electronic device by reducing processing times and storage resources needed to accomplish a task. In particular, by not having to track when each message in a conversation is read to automatically delete such messages, bulk deletion of messages can be performed more efficiently by assigning a bulk read time to all messages based on a read time of the last read message and deleting the messages based on the bulk read time. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a message deletion system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system. 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message deletion system 124. The messaging server application 114 implements a number of message processing technologies and functions, particularly related to the aggregation and other processing of content (e.g., textual and multimedia content) included in messages received from multiple instances of the messaging client application 104, As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message deletion system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The message deletion system 124 manages storage and retention policies for messages exchanged in a communication session. For example, the message deletion system 124 may determine when a given message is read by a recipient in a communication session. In response, the message deletion system 124 starts a timer for deleting the given message from the communication session. In some cases, the message deletion system 124 deletes the given message and any message received prior to the given message in the communication session automatically when the timer reaches a threshold amount of time after 24 hours). The message deletion system 124 stores messages that are received in the conversation session and automatically deletes the messages if they are not read within 31 days from when they are received. This way, the message deletion system 124 allows users in a conversation session to exchange messages with ach other but may only allow the users to see the messages in the conversation session for 24 hours after one or all of the users in the conversation session read the latest message or for 31 days after the messages are received.

In some embodiments, the message deletion system 124 receives a plurality of messages directed to a second user from a first user in a conversation session. The message deletion system 124 stores the messages with an unread status indicator and also stores a timestamp indicating when each message was received from the first user. The second user may launch the messaging application to access the conversation session. In response, the messaging application of the second user's device sends a request to the message deletion system 124 to receive messages that follow a certain timestamp. For example, the second user's device determines when the last time the messaging application was opened by the second user. The second user's device requests that the message deletion system 124 send to the second user's device any message that was sent by the first user after that last time the messaging application was opened by the second user. After the second user's device receives the messages sent by the first user, the messages are displayed in the conversation session on the messaging application to the second user. In some cases, only the last message that was sent by the first user is shown and the second user may scroll up to view previous messages sent by the first user.

Once the last message is displayed to the second user, the second user's device records the read time of the last message. The second user's device sends a notification to the message deletion system 124 indicating the read time for the last message. In response to receiving the notification, the message deletion system 124 stores the read time for all of the messages stored in the message deletion system 124 that are marked as unread (e.g., any message the does not currently have a read time stored). In this way, when the last message is read by the second user and regardless of whether the second user also reads prior messages that the second user's device receives, all the messages currently delivered to the second user are marked as read with the same read time as the latest message the second user has viewed in the conversation session on the messaging application.

The server compares the current time to the read time of each message the message deletion system 124 stores. When the difference between the current time and the read time corresponds to a threshold amount of time (e.g., reaches 24 hours), the message deletion system 124 automatically deletes the messages associated with that particular read time. In some embodiments, the message deletion system 124 compares the current time only to the oldest read time of the messages stored by the message deletion system 124. This way, the sever need not compare the current time to all of the read times continuously. Once the difference between the read time of the oldest read message and the current time corresponds to the threshold amount of time, the message deletion system 124 traverses or iterates through other messages to identify a set of messages associated with the same read time. The message deletion system 124 then automatically deletes all the messages that are associated with the same read time.

In some embodiments, the message deletion system 124 starts a timer when a given message is read by a user of the conversation session. When the timer reaches the threshold amount of time (e.g., 24 hours), the message deletion system 124 automatically deletes that message and any message received prior to the given message.

In some embodiments, certain messages are marked as to be saved based on specific input from a user or because the messages meet some criteria. In such cases, the message deletion system 124 avoids automatically deleting such messages even though the elapsed time since they have been read exceeds the threshold amount time (e.g., messages that would automatically be deleted after 24 hours from when they are read, are retained if the messages are marked to be saved).

In some embodiments, the message deletion system 124 compares the oldest receive time of the messages exchanged in the conversation session to the current time. In some cases, such messages are those that are marked as unread. When a difference between the oldest receive time and the current time exceeds another threshold amount of time (e.g., exceeds 31 days), the message deletion system 124 automatically deletes such messages that are unread. When messages are deleted, none of the users or participants in the communication session in the chat session) can view the contents of the messages.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
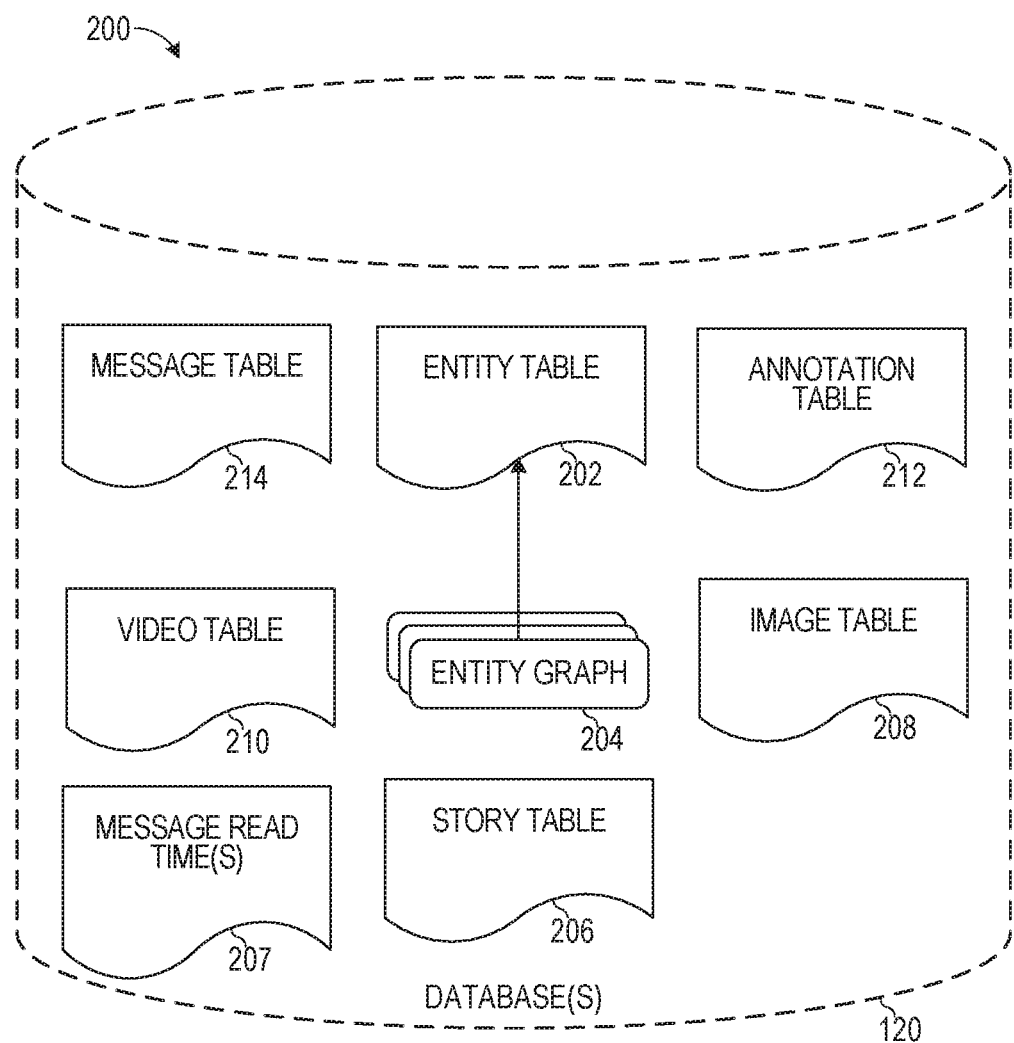
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (UPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image, able 208 and the video table 210.

Message read time(s) 207 stores various information about messages exchanged in a communication session. Such information includes whether the messages have been read or unread, the read time, the receive time, and so forth. Based on the message read time(s) 207 information, the message deletion system 124 determines whether to automatically delete certain messages in a communication session.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
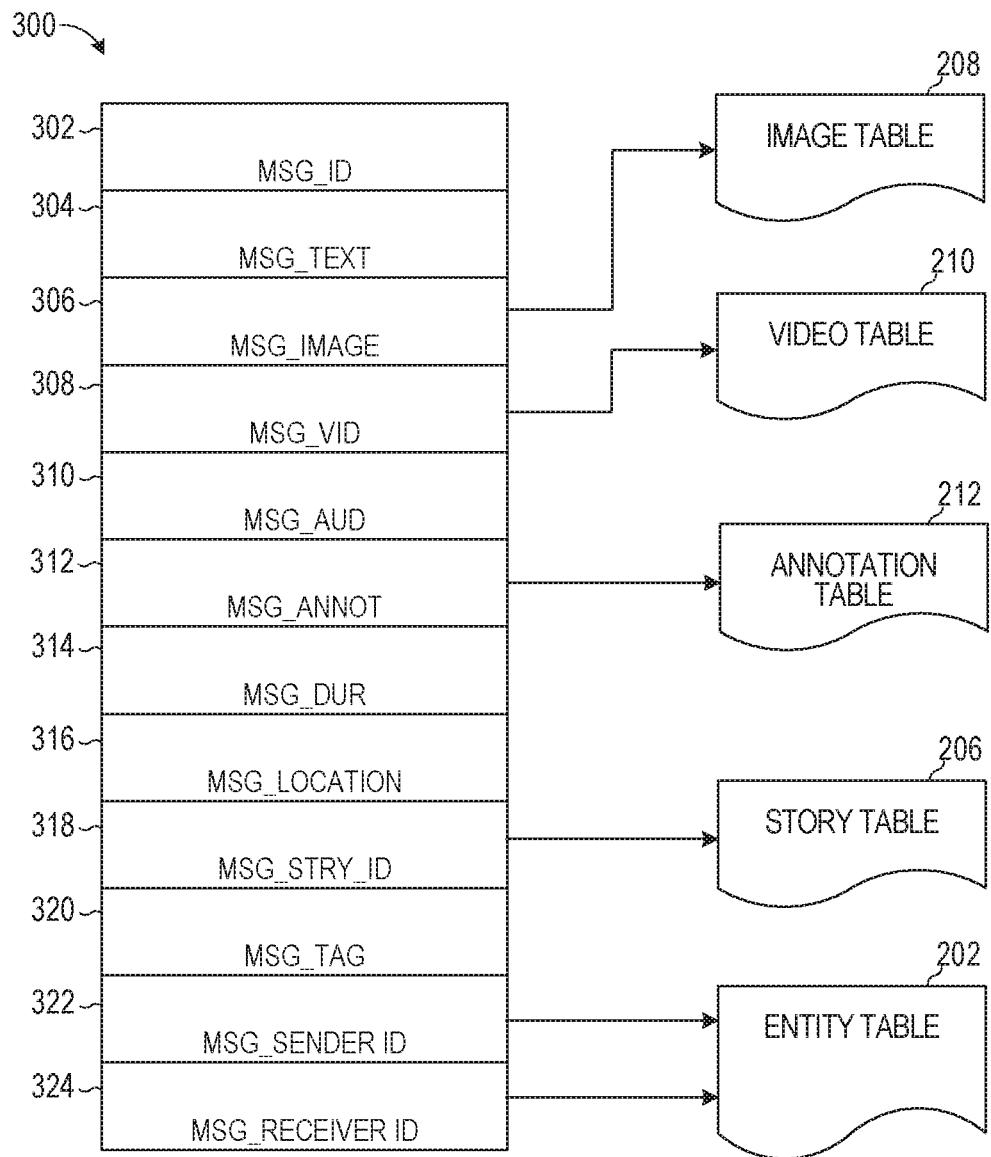
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
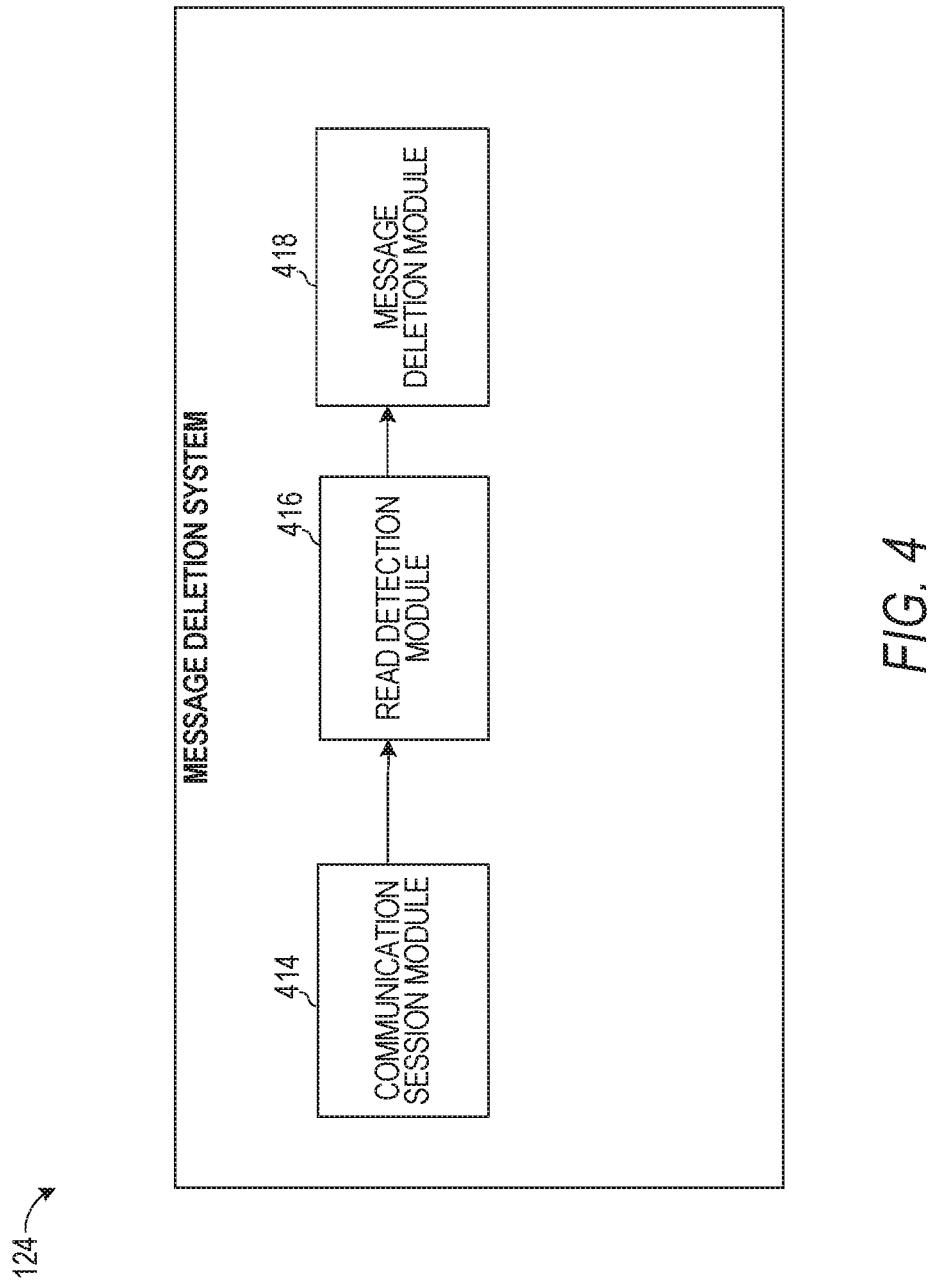
FIG. 4 is a block diagram showing an example message deletion system, according to example embodiments.

FIG. 4 is a block diagram showing an example message deletion system 124, according to example embodiments. Message deletion system 124 includes a communication session module 414, a read detection module 416, and a message deletion module 418. The communication session module 414 enables users to engage in a communication session to exchange messages with each other, in some cases, the communication session includes a group of three or more users in which case any message sent by one user is viewable by the other two users in the group. In some cases, the communication session includes only two users where one user sends messages to another user and vice versa.

After initiating a communication session using the communication session module 414, messages are transferred between users of the communication session using the communication session module 414. For example, the communication session module 414 receives a message from a first user in the communication session and marks the message for transmission to a second user in the communication session. The communication session module 414 stores the message along with various information indicating the recipient, the communication session identifier, and the receive time stamp. When the second user logs into the message application, the communication session module 414 receives an identifier of the second user and determines whether any messages that have not been delivered yet to the second user and that are intended for the second user to receive. In some cases, the communication session module 414 receives a last update timestamp from the second user. The communication session module 414 searches the receive time of all the messages that are intended for receipt by the second user. The communication session module 414 selects those messages that have a receive time that is later than the last update timestamp. The communication session module 414 then sends all of the selected messages to the user device of the second user for presentation in the communication session of the message client application 104.

The second user may open the communication session in the messaging client application 104. Once a message is displayed in the communication session for the second user, the messaging client application 104 stores a read time for the message that is displayed. The messaging client application 104 sends a notification to the read detection module 416 with an identifier of the communication session and an identifier of the message that has been read and the read time of the message. The read detection module 416 then identifies all the messages that are associated with the same communication session identifier that do not have a read time associated with them. As an example, the read detection module 416 identifies all the unread messages that are associated with the communication session identifier received in the notification. The read detection module 416 filters the identified unread messages for those messages that have a receive time that precedes the receive time of the message identified by the identifier received in the notification. Namely, the read detection module 416 finds all the messages that were sent to the second user before the message that has most recently been read by the second user.

The read detection module 416 updates the read time associated with the identified message received in the notification with the read time indicated in the notification. The read detection module 416 also simultaneously or thereafter updates the read times associated with all the filtered unread messages (or all the messages for which a read time is not yet stored and which were received from the first user before the message most recently read by the second user) with the same read time that is indicated in the notification for the message most recently read by the second user. This way, once the second user reads a first message in a communication session, all the messages that were sent to the second user from the first user before the first message are also marked as being read at the same time as the first message. In some cases, the read times are presented to the users in a display of the communication session (e.g., next to the contents of the messages and/or in a separate display in response to receiving a user request to view the read times).

In some embodiments, the storage of a read time for one or more messages in a communication session, initiates a deletion timer for the one or more messages. Specifically, the message deletion module 418 automatically, deletes messages that have been read 24 hours after they are read. Namely, once the deletion timer reaches a specified threshold time period (e.g., 24 hours), the message deletion module 418 deletes the messages and removes them from the communication session. As an example, message deletion module 418 compares the current time to the read time of each message of the communication session. When the difference between the current time and the read time corresponds to a threshold amount of time (e.g., reaches 24 hours), the message deletion module 418 automatically deletes the messages associated with that particular read time.

In some embodiments, the message deletion module 418 compares the current time only to the oldest read time of the messages that are in the communication session. This way, the message deletion module 418 need not compare the current time to all of the read times continuously. Once the difference between the read time of the oldest read message and the current time corresponds to the threshold amount of time, the message deletion module 418 traverses or iterates through other messages to identify a set of messages associated with the same read time. The message deletion module 418 then automatically deletes all the messages that are associated with the same read time.

In some embodiments, certain messages are marked as to be saved based on specific input from a user or because the messages meet some criteria. In such cases, the message deletion module 418 avoids automatically deleting such messages even though the elapsed time since they have been read exceeds the threshold amount time (e.g., messages that would automatically be deleted after 24 hours from when they are read, are retained if the messages are marked to be saved).

In some embodiments, the message deletion module 418 compares the oldest receive time of the messages exchanged in the communication session to the current time. In some cases, such messages are those that are marked as unread. When a difference between the oldest receive time and the current time exceeds another threshold amount of time (e.g., exceeds 31 days), the message deletion module 418 automatically deletes such messages that are unread. When messages are deleted, none of the users or participants in the communication session (e.g., in the chat session) can view the contents of the messages. As such, the message deletion module 418 is configured to delete all prior messages received in a communication session before a given message 24-hours after only the given message has been read by one or all participants in the communication session. Namely, a user need not read all of the messages in the communication session to trigger the 24-hour deletion. The message deletion module 418 is also configured to delete any message that has been received in the communication session more than 31 days ago regardless of whether the message was read or not.

As an example, a recipient may receive 30 messages in a communication session. The recipient may read the $27^{th}$ message at a particular time (e.g., 7 AM) and may read the 22nd-$26^{th}$ messages at a later time (e.g., 8 AM) than the particular time. However, because the 22nd-$26^{th}$ messages were received prior to the $27^{th}$ message, they are associated with the same read time as the $27^{th}$ message (e.g., 7 AM). As such, the message deletion module 418 deletes messages 1-27 24 hours after the $27^{th}$ message is read (e.g., messages 1-27 are deleted the next day at 7 AM even though messages 22-26 were read at 8 AM on the previous day—less than 24 hours after the $27^{th}$ message was read). Messages 28-30 which follow the $27^{th}$ message and which have not yet been read, are not automatically deleted until 24 hours after they are read by the recipient or 31 days after the time stamp of when they were received from a sender by the communication session.

Figure 5:
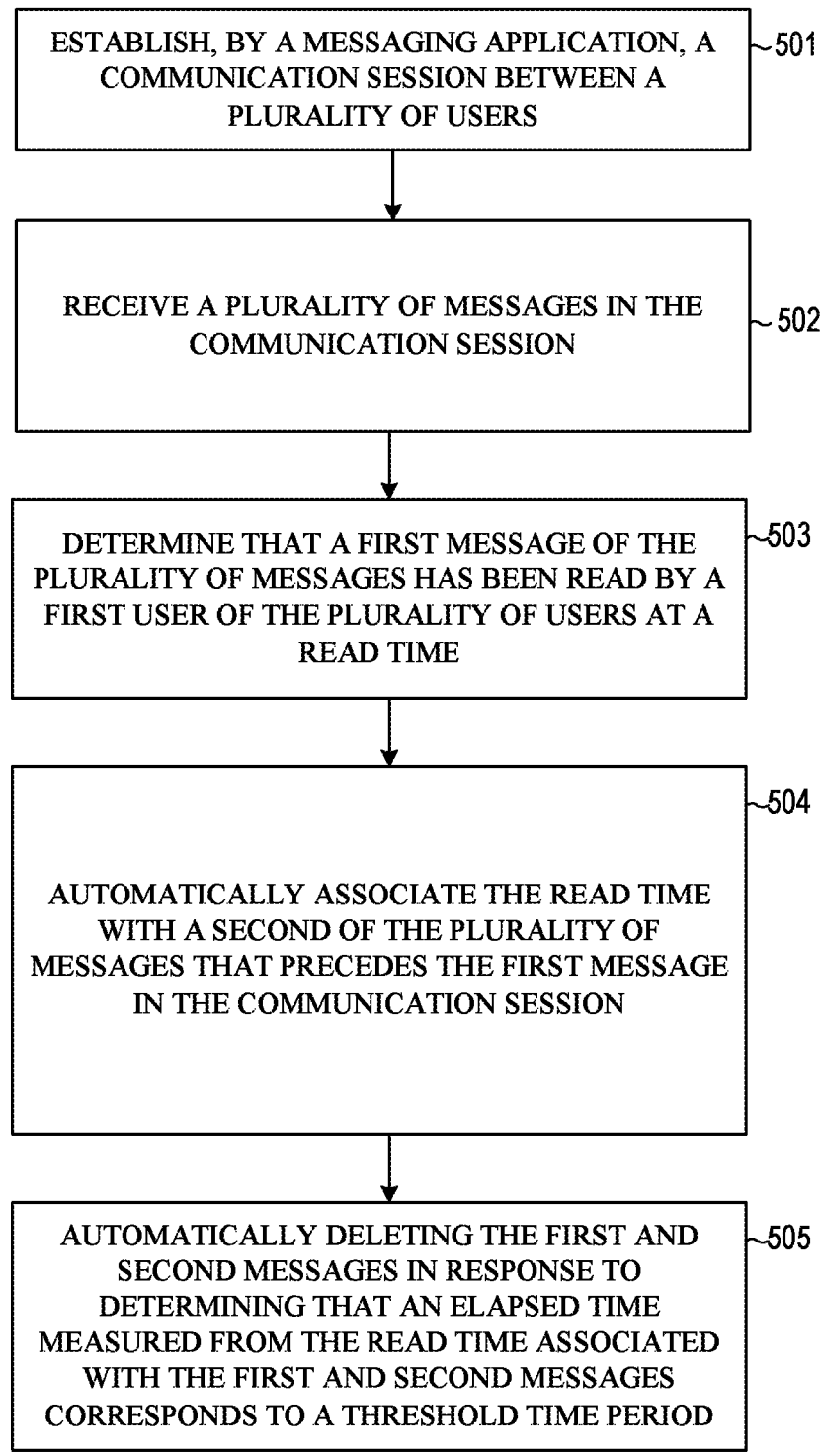
FIG. 5 is a flowchart illustrating example operations e message deletion system, according to example embodiments.

FIG. 5 is a flowchart illustrating example operations of the message deletion system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 1059 accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the message deletion system 124 establishes a communication session between a plurality of users. For example, the communication session module 414 receives input from a first user operating a first client device 102 to send a message to one or more other users. In response, the communication session module 414 establishes a chat session that provides a display to the first user and the one or more other users for enabling the users to see messages exchanged between the users and send messages to each other.

At operation 502, the message deletion system 124 receives a plurality of messages in the communication session. For example, the communication session module 414 receives messages from the first user and/or the one or more other users that are engaged in the communication session. The first user can type in a message or multiple messages and send the messages in the communication session graphical user interface so the other users can see the messages. When the user sends the messages the communication session module 414 receives the messages and stores them.

At operation 503, the message deletion system 124 determines that a first message of the plurality of messages has been read by a first user of the plurality of users at a read time. For example, the message deletion system 124 receives an indication (e.g., a read time) from a user device of the first user when the first user opens the communication session and views the first message (e.g., the last message) that was exchanged or sent in the communication session by one or more other participants or users in the communication session.

At operation 504, the message deletion system 124 automatically associates the read time with a second of the plurality of messages that precedes the first message in the communication session. For example, the message deletion system 124 identifies a set of messages that have earlier timestamps than the message that the user has read and that have also not yet been read by the first user and assigns the same read time as that which was assigned to the first message.

At operation 505, the message deletion system 124 automatically deletes the first and second messages in response to determining that an elapsed time measured from the read time associated with the first and second messages corresponds to a threshold time period. For example, when a 24-hour period of time has elapsed since the read time associated with the messages, the message deletion system 124 automatically deletes the messages associated with at read time.

Figure 6:
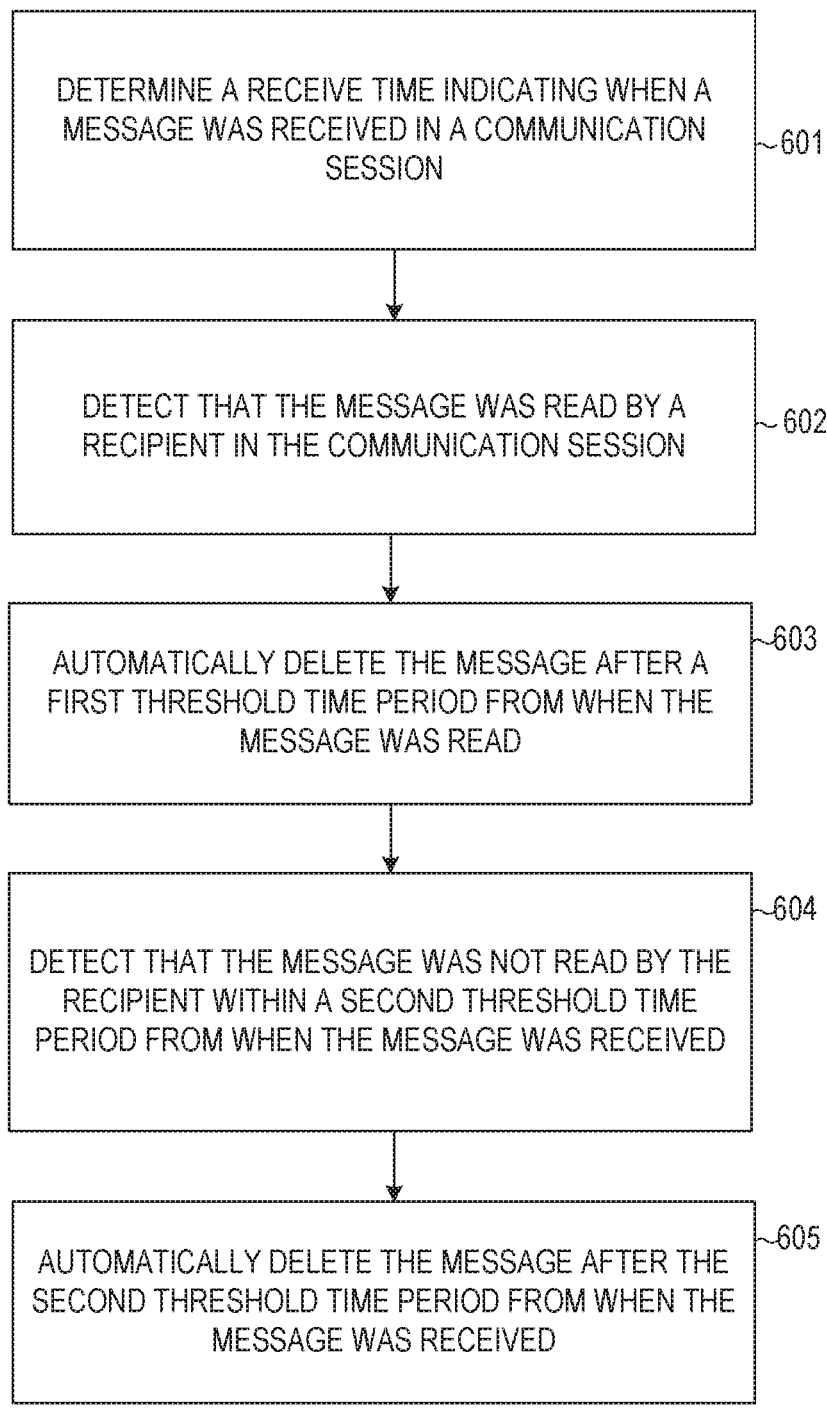
FIG. 6 is a flowchart illustrating example operations of the message deletion system, according to example embodiments.

FIG. 6 is a flowchart illustrating example operations of the message deletion system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application 1059 accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the message deletion system 124 determines a receive time indicating when a message was received in a communication session. For example, the message deletion system 124 associates a timestamp with each message that is received in the communication session indicating when the message was received (or sent by another user in the communication session)

At operation 602, the message deletion system 124 detects that the message was read by a recipient in the communication session. For example, the message deletion system 124 receives an indication (e.g., a read time) from a user device of the first user when the first user opens the communication session and views the first message (e.g., the last message) that was exchanged or sent in the communication session by one or more other participants or users in the communication session.

At operation 603, the message deletion system 124 automatically deletes the message after a first threshold time period from when the message was read. For example, when a 24-hour period of time has elapsed since the read time associated with the messages, the message deletion system 124 automatically deletes the messages associated with that read time.

At operation 604, the message deletion system 124 detects that the message was not read by the recipient within a second threshold time period from when the message was received. For example, the message deletion system 124 determines that the timestamp of a given message is more than 31 days old (e.g., the timestamp exceeds a 31 day period of time). The message deletion system 124 may continuously or periodically process the receive timestamps of messages that are exchanged in the communication session to identify messages that have been received more than 31 days earlier than the present time.

At operation 605, the message deletion system 124 automatically deletes the message after the second threshold time period from when the message was received. For example, the message deletion system 124 automatically deletes any message that was received more than 31 days before the current time regardless of whether that message was read or not.

Figure 7:
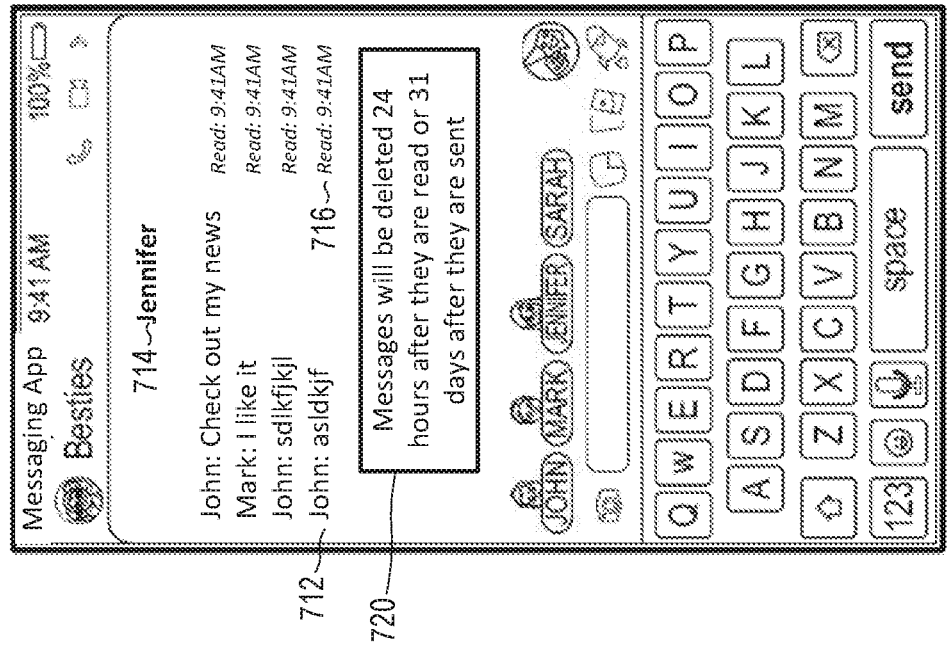
FIG. 7 shows illustrative inputs and outputs of the message deletion system, according to example embodiments.

FIG. 7 includes illustrative inputs and outputs of the message deletion system 124, according to example embodiments. The message deletion system 124 causes presentation of a graphical user interface 710 on a messaging client application 104. The graphical user interface 710 includes a display of messages that are part of a communication session between multiple users (e.g., John, Mark and Jennifer). The graphical user interface 710 is presented to given user 714 (e.g., Jennifer). The graphical user interface 710 indicates the read time 716 for each message indicating when the given user 714 has read the messages. In some cases, once the given user 714 logs in and downloads the messages that are part of the communication session (e.g., at 9:41 AM), the latest message is automatically presented to the given user 714. The given user 714 can scroll up to view earlier messages. Even though the earlier messages are not viewed at the same time as the latest message (e.g., the given user 714 scrolls up to view the earlier messages at a later time), all the messages are associated with the same read time (e.g., 9:41 AM) as the time at which the latest message was read by the given user 714. A notification 720 is presented to the given user 714 indicating the deletion policy (e.g., the messages are deleted automatically 24 hours after they are read or 31 days after they are sent regardless of when they are read or if they are read at all). In this case, the messages presented in the communication session and all prior messages to those presented in the communication session will be automatically deleted 24 hours after 9:41 AM (e.g., the next day at 9:41 AM).

Figure 8:
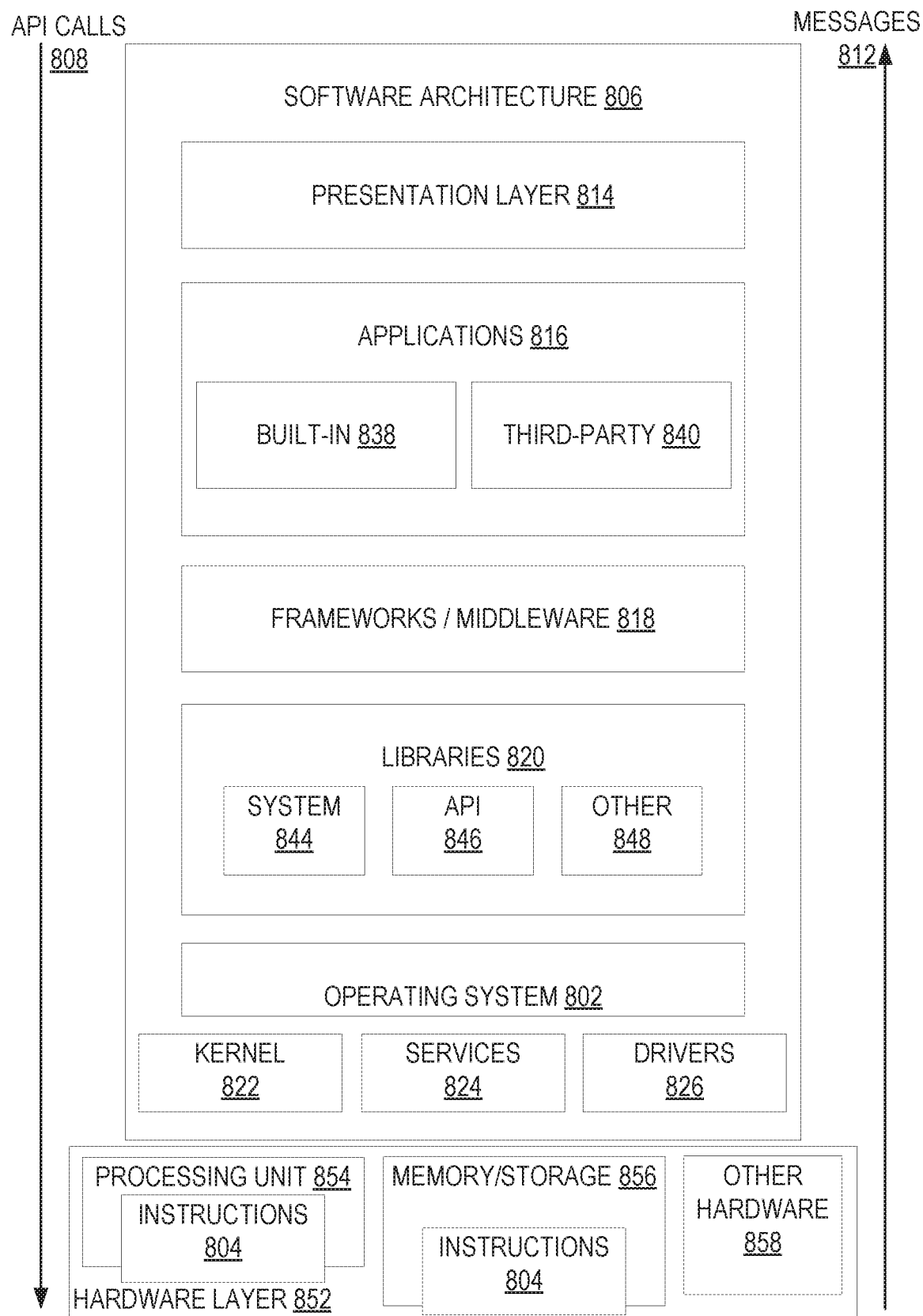
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918, A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display, drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
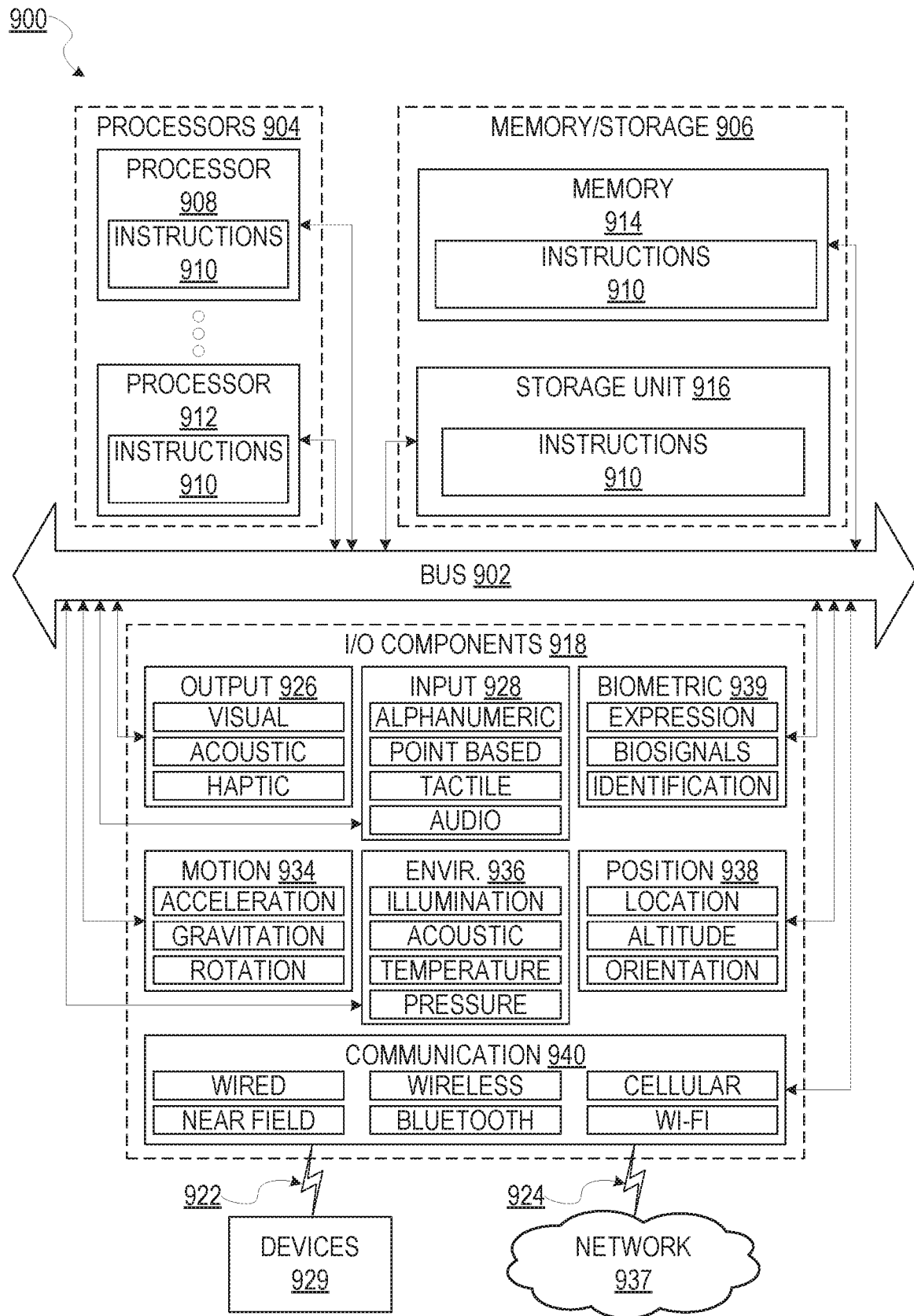
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a. GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via. Internet Protocol (IP) geolocation, location via Wi-Fi® signal triangulation, location via detecting a NFC beacon signal that may indicate a particular location, and so forth.

GLOSSARY

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a RFIC or any combination thereof. A processor 908 may further be a multi-core processor having two or more independent processors 904 (sometimes referred to as "cores") that may execute instructions 910 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   establishing, by one or more processors of a computing device, a communication session between a plurality of users;
   receiving a plurality of messages in the communication session;
   determining that a first message of the plurality of messages has been read by a first user of the plurality of users at a read time;
   in response to determining that the first message has been read by the first user at the read time, automatically associating the read time with a second of the plurality of messages that precedes the first message in the communication session; and
   automatically deleting the first and second messages in response to determining that an elapsed time measured from the read time associated with the first and second messages corresponds to a threshold time period.

2. The method of claim 1, further comprising automatically deleting messages received in the communication session within the threshold time period of respective read times of the messages.

3. The method of claim 1, wherein the threshold time period is a first threshold time period, wherein the communication session includes a message deletion policy that automatically deletes the plurality of messages within the first threshold time period from when one or more messages of the plurality of messages are read, and wherein the message deletion policy automatically deletes the one or more messages within a second threshold time period from when the one or more messages are received.

4. The method of claim 3, wherein the second threshold time period is longer than the first threshold time period.

5. The method of claim 3, wherein the first threshold time period is 24 hours, and the second threshold time period is 31 days.

6. The method of claim 1, further comprising:
   computing a difference between a current time and the read time to determine the elapsed time;
   comparing the elapsed time to the threshold time period; and
   in response to determining that the elapsed time exceeds the threshold time period, automatically deleting messages associated with the read time including the first and second messages.

7. The method of claim 1, further comprising:
   initiating a timer when the first message is read by the first user;
   determining when the timer reaches the threshold time period; and
   in response to determining that the timer has reached the threshold time period, automatically deleting the first message and one or more messages including the second message received prior to the first message.

8. The method of claim 1, wherein the first message was sent by a second user of the plurality of users, and wherein automatically deleting the first message comprises removing the first message from the communication session to make the message inaccessible to the plurality of users including the second user.

9. The method of claim 1, wherein the first message is received from a second user of the plurality of users, further comprising:
    storing the first message on a server in association with the communication session;
    sending the first message to a messaging application implemented on a user device of the first user;
    detecting that the first user has opened the communication session in the messaging application on the user device;
    causing the first message to be displayed in the communication session that has been opened in the messaging application on the user device; and
    receiving a notification by the server indicating that the first message has been read by the first user in response to displaying the first message, the notification comprising the read time.

10. The method of claim 9, further comprising:
    receiving the notification by the server indicating that the first message has been read;
    identifying a set of messages including the second message that has been received in the communication session before the first message; and
    storing the read time included in the notification with each message in the set of messages.

11. A system comprising:
    a processor configured to perform operations comprising:
        establishing, by a computing device, a communication session between a plurality of users;
        receiving a plurality of messages in the communication session;
        determining that a first message of the plurality of messages has been read by a first user of the plurality of users at a read time;
        in response to determining that the first message has been read by the first user at the read time, automatically associating the read time with a second of the plurality of messages that precedes the first message in the communication session; and
        automatically deleting the first and second messages in response to determining that an elapsed time measured from the read time associated with the first and second messages corresponds to a threshold time period.

12. The system of claim 11, the operations further comprising:
    automatically deleting messages received in the communication session within the threshold time period of respective read times of the messages.

13. The system of claim 11, wherein the threshold time period is a first threshold (line period, wherein the communication session includes a message deletion policy that automatically deletes the plurality of messages within the first threshold time period from when one or more messages of the plurality of messages are read, and wherein the message deletion policy automatically deletes the one or more messages within a second threshold time period from when the one or more messages are received.

14. The system of claim 13, wherein the second threshold time period is longer than the first threshold time period.

15. The system of claim 13, wherein the first threshold time period is 24 hours, and the second threshold time period is 31 days.

16. The system of claim 11, the operations further comprising:
    computing a difference between a current time and the read time to determine the elapsed time;
    comparing the elapsed time to the threshold time period; and
    in response to determining that the elapsed time exceeds the threshold time period, automatically deleting messages associated with the read time including the first and second messages.

17. The system of claim 11, the operations further comprising:
    initiating a timer when the first message is read by the first user;
    determining when the timer reaches the threshold time period; and
    in response to determining that the timer has reached the threshold time period, automatically deleting the first message and one or more messages including the second message received prior to the first message.

18. The system of claim 11, wherein the first message was sent by a second user of the plurality of users, and wherein automatically deleting the first message comprises removing the first message from the communication session to make the message inaccessible to the plurality of users including the second user.

19. The system of claim 11, wherein the first message is received from a second user of the plurality of users, and the operations further comprising:
    storing the first message on a server in association with the communication session;
    sending the first message to a messaging application implemented on a user device of the first user;
    detecting that the first user has opened the communication session in the messaging application on the user device;
    causing the first message to be displayed in the communication session that has been opened in the messaging application on the user device; and
    receiving a notification by the server indicating that the first message has been read by the first user in response to displaying the first message, the notification comprising the read time.

20. A non-transitory machine-readable storage medium that includes instructions that, when executed by one or more processors of a machine, cause the machine to perform operations comprising:
    establishing, by a computing device, a communication session between a plurality of users;
    receiving a plurality of messages in the communication session;
    determining that a first message of the plurality of messages has been read by a first user of the plurality of users at a read time;
    in response to determining that the first message has been read by the first user at the read time, automatically associating the read time with a second of the plurality of messages that precedes the first message in the communication session; and
    automatically deleting the first and second messages in response to determining that an elapsed time measured from the read time associated with the first and second messages corresponds to a threshold time period.

* * * * *

UNITED STATES PATENT AND TRADEMARK OFFICE
CERTIFICATE OF CORRECTION

| | | |
|---|---|---|
| PATENT NO. | : 11,316,806 B1 | |
| APPLICATION NO. | : 16/774869 | |
| DATED | : April 26, 2022 | |
| INVENTOR(S) | : Baron et al. | |

It is certified that error appears in the above-identified patent and that said Letters Patent is hereby corrected as shown below:

In the Claims

In Column 23, Line 50, in Claim 13, delete "(line" and insert --time-- therefor

Signed and Sealed this
Fifteenth Day of November, 2022

Katherine Kelly Vidal
*Director of the United States Patent and Trademark Office*